(12) United States Patent
Donne

(10) Patent No.: US 11,186,487 B2
(45) Date of Patent: Nov. 30, 2021

(54) MANGANESE DIOXIDE-BASED COMPOSITE MATERIAL AND A METHOD FOR PRODUCTION THEREOF

(71) Applicant: MCD Technologies S.a r.l., Bertrange (LU)

(72) Inventor: Scott Donne, Callaghan (AU)

(73) Assignee: MCD TECHNOLOGIES S.A R.L., Bertrange (LU)

(*) Notice: Subject to any disclaimer, the term of this patent is extended or adjusted under 35 U.S.C. 154(b) by 78 days.

(21) Appl. No.: 16/106,353

(22) Filed: Aug. 21, 2018

(65) Prior Publication Data
US 2020/0062596 A1    Feb. 27, 2020

(51) Int. Cl.
*C01B 32/168* (2017.01)
*C01B 32/159* (2017.01)
*C01G 45/02* (2006.01)
*C25D 11/02* (2006.01)

(52) U.S. Cl.
CPC .......... *C01B 32/168* (2017.08); *C01B 32/159* (2017.08); *C01G 45/02* (2013.01); *C25D 11/02* (2013.01); *C01B 2202/02* (2013.01); *C01B 2202/34* (2013.01); *C01B 2202/36* (2013.01); *C01P 2004/61* (2013.01)

(58) Field of Classification Search
None
See application file for complete search history.

(56) References Cited

U.S. PATENT DOCUMENTS

| | | | | |
|---|---|---|---|---|
| 2003/0118906 A1* | 6/2003 | Bowden | ............... | H01M 4/502 429/224 |
| 2004/0109822 A1* | 6/2004 | Davis | ............... | C01G 45/02 423/605 |
| 2006/0051673 A1* | 3/2006 | Johnson | ............. | C01G 45/1221 429/224 |
| 2011/0223493 A1* | 9/2011 | Christian | ............... | H01M 4/366 429/344 |
| 2014/0287317 A1* | 9/2014 | Tiquet | ............... | C01B 33/02 429/231.8 |
| 2014/0377655 A1* | 12/2014 | Mun | ............... | H01M 10/0525 429/220 |

OTHER PUBLICATIONS

English abstract of CN 107681157, Cao et al. (Year: 2018).*
English abstract of CN 104098085, Li et al. (Year: 2014).*

* cited by examiner

*Primary Examiner* — Ronak C Patel
(74) *Attorney, Agent, or Firm* — Bardmesser Law Group

(57) ABSTRACT

A composite material includes electro-deposited manganese dioxide particles of up to 110 micron in size and in a form of γ-modification of manganese dioxide; and single-walled carbon nanotubes with a diameter of 1 to 2 nm and a length of 1 to 5 μm, wherein a content of the carbon nanotubes is 0.0001 to 0.1 wt % of the composite material. Optionally, the particles have an average size of about 40-60 microns. Optionally, the carbon nanotubes form a coating on a surface of the particles and extend inward from the surface. Optionally, the single-wall carbon nanotubes form a three-dimensional conductive network in the material.

8 Claims, 4 Drawing Sheets

MANGANESE DIOXIDE-BASED COMPOSITE MATERIAL AND A METHOD FOR PRODUCTION THEREOF

BACKGROUND OF THE INVENTION

Field of the Invention

The invention relates to materials used in electrochemical power sources and supercapacitors, as well as processes and technologies for producing such materials.

Description of the Related Art

Manganese dioxide ($MnO_2$) is widely used as an active electrode material in creating various electrochemical power sources, which is accounted for by its good electrochemical activity at a low cost. For the same reason, manganese dioxide is used as an active material in batteries and accumulators with both aqueous (alkaline and neutral) and non-aqueous electrolytes typically based on lithium salts.

At the same time, the relatively low electrical conductivity of manganese dioxide is its major shortcoming. Carbon black or special grades of graphite, such as SuperP or TIMCAL KS6, are usually used as conductive additives that are added to electrodes containing manganese dioxide to increase their overall conductivity. The concentration of conductive additives in electrodes is typically 4 to 20 wt %.

The principal method for increasing the conductivity of electrodes containing manganese dioxide is creating composite materials having a large area of the active surface with conductive materials. Typically such composite materials are nanostructures containing manganese dioxide $MnO_2$ and various allotropic modifications of carbon, e.g. mesoporous carbon [Y. Lei, C. Fournier, J. Pascal, F. Favier, Micropor. Mesopor. Mater. 110 (2008) 167], thermally expanded graphite [C. Y. Wan, K. Azumi, H. Konno, Electrochim Acta 52 (2007) 3061], soot [Y. Xue et al., Materials Letters 62 (2008) 3884-3886], SuperP carbon black [R. Jiang et al./ Electrochimica Acta 54 (2009) 3047-3052], graphene [Jun Yan, Zhuangjun Fan, Tong Wei, Weizhong Qian, Milin Zhang, Fei Wei, Carbon 48, (2010), pp. 3825-3833].

Many opportunities for creating nanocomposite materials based on manganese dioxide with the enhanced electrochemical properties are provided by the use of carbon nanotubes as a conductive agent in these materials. Carbon nanotubes have high conductivity and specific surface area.

Thus, a composite material is known to contain manganese dioxide and multiwall carbon nanotubes with the content of nanotubes of 10 to 75 wt %. [S. Zhang et al.:/Electrochimica Acta 55 (2010) 7447-7453]. The downside of this material is its high cost due to high content of expensive carbon nanotubes, 10 to 75 wt %. The cost of the prototype is also affected by the complex production process, which includes the step of functionalization of multi-wall carbon nanotubes. Additionally, the energy density of this composite is quite low because of the relatively low loading of manganese dioxide, the component with the highest energy density.

SUMMARY OF THE INVENTION

The invention relates to a composite manganese dioxide-carbon nanotube material that substantially overcomes one or more disadvantages of the related art.

In an exemplary embodiment, a composite material includes electro-deposited manganese dioxide particles of up to 110 micron in size and in a form of γ-modification of manganese dioxide; and single-walled carbon nanotubes with a diameter of 1 to 2 nm and a length of 1 to 5 μm, wherein a content of the carbon nanotubes is 0.0001 to 0.1 wt % of the composite material. Optionally, the particles have an average size of about 40-60 microns. Optionally, the carbon nanotubes form a coating on a surface of the particles and extend inward from the surface. Optionally, the single-wall carbon nanotubes form a three-dimensional conductive network in the material.

In another embodiment, a composite material includes electro-deposited manganese dioxide particles of up to 110 micron in size and in a form of γ-modification of manganese dioxide; a coating of carbon nanotubes with a diameter of 1 to 2 nm and a length of 1 to 5 μm; and a three-dimensional structure of carbon nanotubes penetrating into the particles, wherein a content of the carbon nanotubes is 0.0001 to 0.1 wt % of the composite material.

Optionally, the particles have an average size of about 40-60 microns. Optionally, the carbon nanotubes are single walled. Optionally, the single-wall carbon nanotubes form a three-dimensional conductive network in the material.

In another embodiment, a method for producing a composite material, includes immersing anode and cathode in a tank filled with an electrolyte, wherein a mixture of aqueous solutions 0.1-1.5 M $MnSO_4$ and 0.05-0.5 M $H_2SO_4$, as well as a suspension of single-wall carbon nanotubes, is used as the electrolyte; applying voltage to the anode and the cathode at a current density on the anode in a range of 10 to 100 $A/m^2$ so to as to produce a reaction Anode (Ti): $Mn^{2+}+2H_2O \rightarrow MnO_2+4H^++2\bar{e}$ 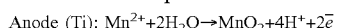

Cathode (Cu): $2H^++2\bar{e} \rightarrow H_2$. 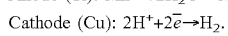

depositing a γ-modification of manganese dioxide on the anode; evolving gaseous hydrogen on a cathode; capturing the carbon nanotubes in the electrolyte during manganese dioxide electrodeposition and delivered the carbon nanotubes to the anode so as to embed them in the manganese dioxide; removing the composite material from the anode; milling and sieving the composite material; and neutralizing the composite material. Optionally, the electrolyte is 1.3 M+/−10% $MnSO_4$ and 0.3 M+/−10% $H_2SO_4$.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

This invention addresses the issue of creating a manganese dioxide-based composite material with high electrical conductivity at a low cost suitable for use in electrochemical power sources, such as batteries and supercapacitors.

The objective is achieved by providing a composite material that includes the γ-modification of manganese dioxide in the form of particles <1 μm up to ~100 μm in size (in some cases possibly up to about 110-115 μm in size, and typically about 40-60 μm in size), and single-wall nanotubes with a diameter of 1 to 2 nm and a length of at least 1 μm, with the content of the nanotubes in the material of 0.0001 to 0.1 wt %.

In the provided composite material, single-wall carbon nanotubes form a three-dimensional conductive network within the manganese dioxide particles.

The objective is also achieved by providing a method for producing this composite material by anodic electrodeposition in an electrolyte containing an aqueous solution of manganese sulphate ($MnSO_4$), an aqueous solution of sulphuric acid ($H_2SO_4$), in which single-wall carbon nanotubes are suspended.

Electrodeposition is performed in a tank with parallel anodes and cathodes shaped as plates of the same area, wherein they are installed alternately in a row and such that each anode is placed between two cathodes.

Figure 1:
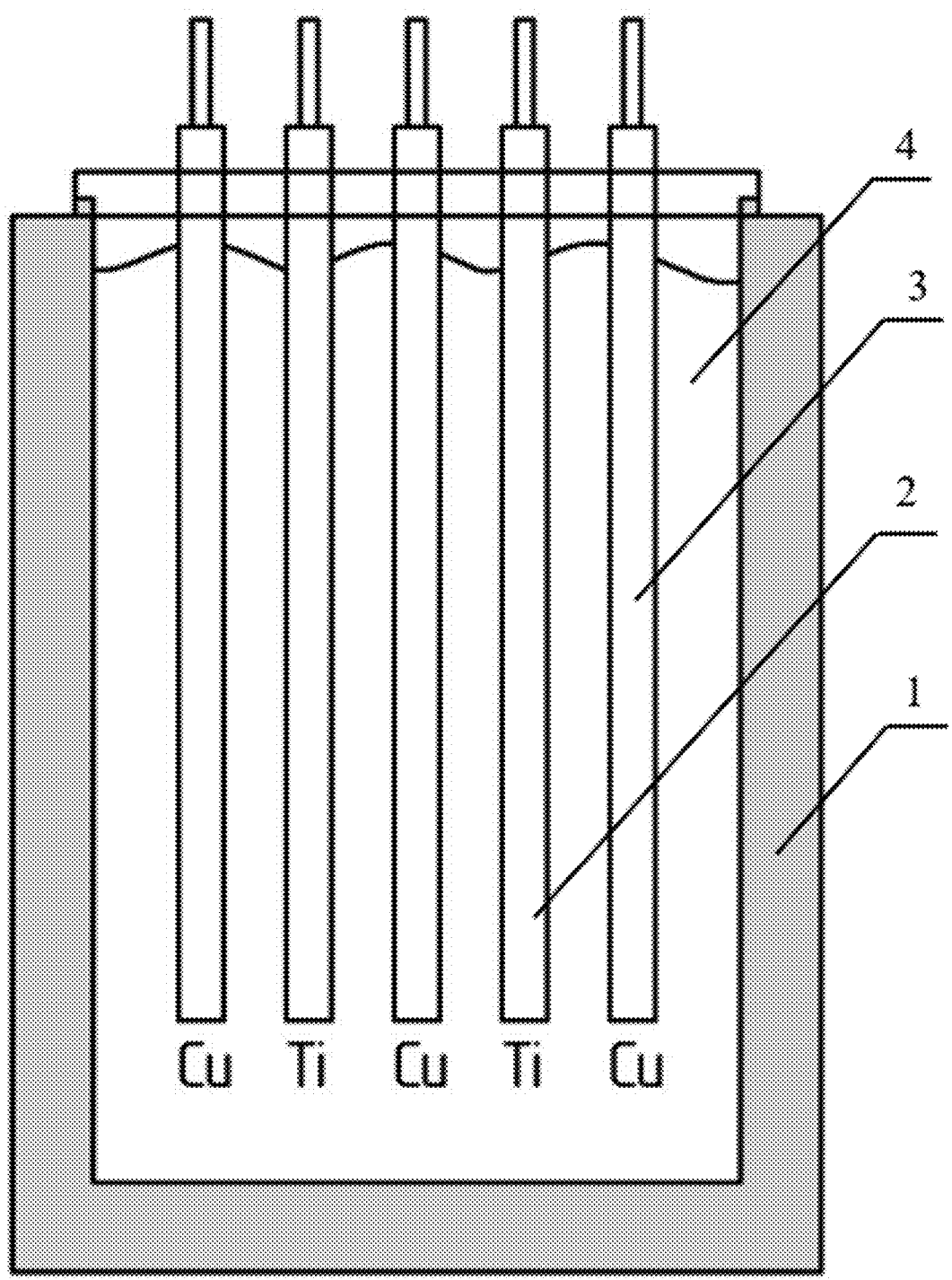
FIG. 1 illustrates an exemplary reactor for producing the composite material of the present invention.

The inventive composite material is produced by electrodeposition in a device, the schematic diagram of which is shown in FIG. 1, where 1 is the tank, 2 is the anode, 3 is the cathode, and 4 is the electrolyte.

The electrodes of the device shown in the drawing are shaped as plates of the same size, but made of different materials: the anodes 2 in this case are made of titanium, although they could also be made of an alternate anode substrate such as carbon, platinum or gold, in some cases lead (Pb) or an iridium oxide ($IrO_2$)-coated electrode can be used. The anode has to be stable under hot acidic anodic conditions, for which there are only a relatively few (practical) materials available. The cathodes 3 in this case are made of copper, although they could also be made of carbon, or other appropriate cathode substrates, for example, catalytically active options could be used, like noble metals (Pt, Au, etc.). They are installed in parallel to each other and alternately in a row. The electrode row begins and ends with cathodes, i.e., each anode neighbors two cathodes.

The electrodes are immersed in the tank 1 filled with the electrolyte 4. A mixture of aqueous solutions 1.3 M $MnSO_4$ and 0.3 M $H_2SO_4$, as well as a suspension of single-wall carbon nanotubes is used as the electrolyte. The electrolyte composition is a variable here with wide ranging concentrations of manganese sulfate and sulfuric acid able to be used. Similarly, alternate electrolytes can be used, such as those for example based on nitrate or chloride salts. Furthermore, the concentration of suspended carbon nanotubes is also a variable affecting the composition of the final manganese dioxide product.

The synthesis of the composite material is performed by electrodeposition. To do this, the electrodes are energized, and the potential difference is set at such a value that chemical reactions proceed in the electrolyte according to the following equations:

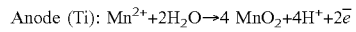

Anode (Ti): $Mn^{2+}+2H_2O \rightarrow 4\ MnO_2+4H^++2\overline{e}$

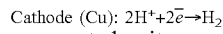

Cathode (Cu): $2H^++2\overline{e} \rightarrow H_2$

The current density on the anode is maintained in the range of 10 to 100 A/m², and the γ-modification of manganese dioxide is deposited on the anode. At the same time, gaseous hydrogen is evolved on the cathode.

The emission of hydrogen promotes vigorous agitation of the electrolyte in the space between the electrodes and is accompanied by convection, which is fairly high and helps the single-wall carbon nanotubes to reach the anode plate. Carbon nanotubes in the electrolyte are captured in the process of manganese dioxide electrodeposition and delivered to the anode, where they are embedded in the structure of the material being deposited.

The composite material deposited on the anode, which consists of manganese dioxide and embedded carbon nanotubes, is then removed from the anode substrate, milled and sieved to an appropriate particle size, and then neutralized to ensure the removal of any entrained plating electrolyte.

Figure 3:
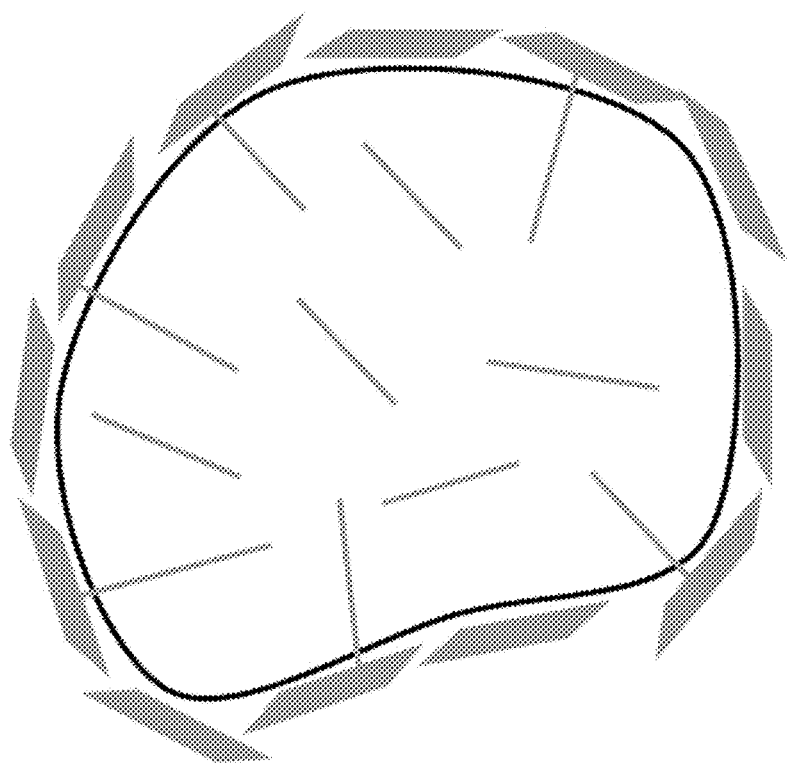
FIG. 3 shows the arrangement of carbon nanotubes on the manganese dioxide particles.
Figure 3:
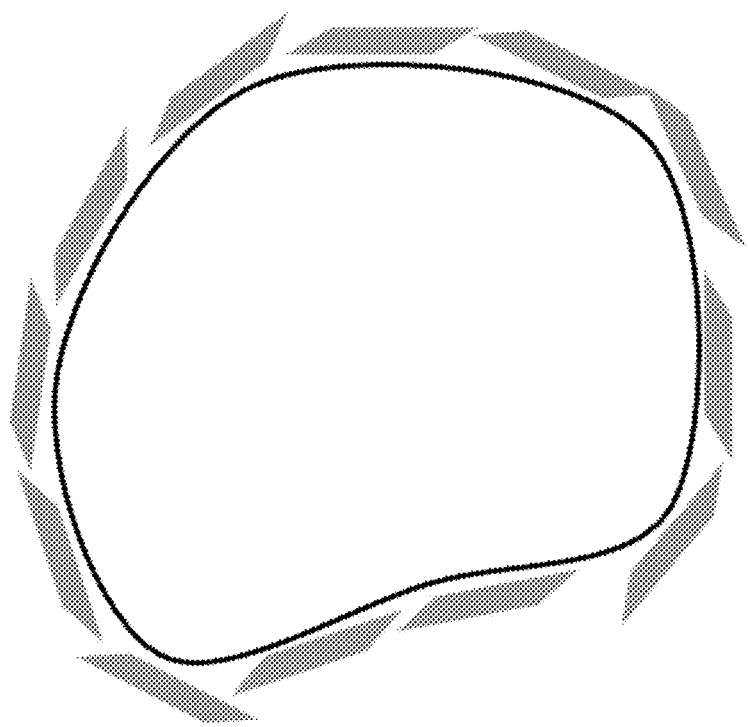

The obtained composite material contains manganese dioxide particles with a size in the range <1 μm to about 100 μm (in some cases, up to 110 microns) and single-wall carbon nanotubes having a diameter of 1 to 2 nm and a length of 1 to 5 μm, in the amount of 0.0001 to 0.1 wt %, uniformly distributed throughout the manganese dioxide. Uniformly distributed single-wall carbon nanotubes form a three-dimensional conductive network within the material, such as shown in FIG. 3 on right, where the carbon nanotubes project inward into the manganese dioxide particles from the carbon nanotube coating. This conductive network increases the conductivity of the original manganese dioxide by up to 5 to 7 times.

The composite material has a lower cost compared to the prototype, which is due to the low content of nanotubes, the more efficient use of nanotubes in the material, and an easier production method which does not require pre-modification of carbon nanotubes.

EXAMPLE

The composite material γ-$MnO_2$/SWCNT is produced by anodic electrodeposition. The electrolytic cell is a 2 L glass vessel thermostatically controlled at 98° C. and filled with an aqueous electrolyte solution consisting of $MnSO_4$ (1.3 mol/L), $H_2SO_4$ (0.3 mol/L) with the addition of single-wall carbon nanotubes in a dispersion containing 0.01 wt % of single-wall nanotubes. (More generally, the $MnSO_4$ concentration can range from 0.1-1.5 M, while the $H_2SO_4$ concentration can range from 0.05-0.5 M.)

Two titanium plates with a total area, in this example, of 144 cm² each (72 cm² on either side, 1 mm thick, 6 cm wide and 12 cm long) each are used as anodes, and three copper plates of identical size are used as cathodes. The electrodes are installed alternately in the vessel, such that each anode is between two cathodes.

The electrodeposition of γ-$MnO_2$ is performed with the current density on the anode being 65 A/m², according to the following equations:

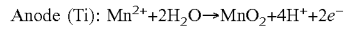

Anode (Ti): $Mn^{2+}+2H_2O \rightarrow MnO_2+4H^++2e^-$

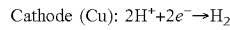

Cathode (Cu): $2H^++2e^- \rightarrow H_2$

The overall reaction: $Mn^{2+}+2H_2O \rightarrow 4\ MnO_2+2H^++H_2$

The electrodeposition process is conducted for about 24 hours.

A solution of more concentrated manganese sulphate $MnSO_4$ is added to the electrolyte solution in the electrolysis cell at a fixed rate to maintain the constant concentration of the $Mn^{2+}$ ions in the electrolyte and to dilute the excess amount of $H_2SO_4$ generated as part of the overall electrolysis process.

The manganese(II) ions are oxidized on the anode and electrodeposited as manganese dioxide.

Carbon nanotubes also reach the surface of the anode plate due to convection, which is fairly high in the electrolysis cell due to the evolution of hydrogen on the cathode.

When the electrodeposition process is completed, the solid deposit is physically removed from the anode, milled to an appropriate particle size, and neutralized with the addition of dilute NaOH solution to remove any entrained plating electrolyte. This solid deposit contains γ-manganese dioxide and carbon nanotubes.

The deposit is then ground into pieces and placed in ~500 mL of purified water. The acidity of the solution with a γ-$MnO_2$ suspension is adapted to pH=7 by adding a NaOH (0.1 mol/L) solution. After ~24 hours, this suspension is filtered, and the γ-$MnO_2$ pieces are dried at 110° C. After drying, the manganese dioxide pieces are milled into powder with a particle size V105 μm (average particle size is ~45 μm) using an orbital zirconium mill. The ground powder is resuspended in ~500 mL of water treated with the Milli-Q system, and the solution acidity is brought to pH=7 by adding a NaOH (0.1 mol/L) solution. The powder is then refiltered and dried at 110° C.

Structural and Morphological Characterization of the material

To determine the $MnO_2$ phase in each of the samples and if the single walled CNT have an effect during the deposition process, X-ray diffraction was conducted. A Phillips™ X'Pert MPD equipped with a Cu Kα radiation source (λ=0.15418 nm) operated at 40 kV and 30 mA between 5-90° 2θ using a 0.026 θ step increment.

X-ray diffraction was one of the main tools used to analyze the structure of the material. The patterns for each of the samples are shown in FIG. 9. Each of the peaks were indexed with their respective Miller indices, and their lattice parameters were calculated indicating assuming an orthorombic unic cell and the results shown in Table 1. The calculated lattice parameters were found to be in agreement with the literature.

The crystallite size of each material was determined using the Scherrer equation; i.e., $$T = \frac{K\lambda}{\beta_s \cos(\theta)}$$

where T is the average thickness of the crystal in its diffracting plane (Å), K is the unitless shape factor constant (0.9), λ is the wavelength of radiation (1.5418 Å), $\beta_s$ is the peak broadening (radians) due to crystallite size (radians) and θ is the diffraction angle (radians) of the peak being considered. Each of the samples have a rather small average crystallite size, however, due to the rapid electrodeposition process the small crystallite size is common. Based on the XRD pattern there is no noticeable difference as a result of the introduction of carbon nanotubes into the structure meaning that any deviations in the $MnO_2$-CNT composite materials are the result of fluctuations in the electrodeposition process, such as acid concentration, temperature and current density. It should be noted that FIG. 1b exhibits higher normalized intensities due to the difference in method used to record the pattern in order to normalize the intensity of the peaks.

TABLE 1

Structural properties of the $MnO_2$ - composite samples

| | Structure | | | Volume | Crystallite Size (nm) | | | |
|---|---|---|---|---|---|---|---|---|
| | a (nm) | b (nm) | c (nm) | (nm³) | 110 | 021 | 240 | 061 |
| EMD | 0.443 | 0.946 | 0.283 | 0.119 | 4.3 | 31.4 | 18.8 | 15.8 |
| 0 | 0.448 | 0.956 | 0.283 | 0.121 | 6.2 | 21.4 | 16.1 | 10.5 |
| 0.005% | 0.447 | 0.964 | 0.279 | 0.120 | 5.2 | 23.5 | 15.6 | 11.67 |
| 0.02% | 0.447 | 0.962 | 0.279 | 0.119 | 4.1 | 20.8 | 15.4 | 14.0 |

Figure 2:
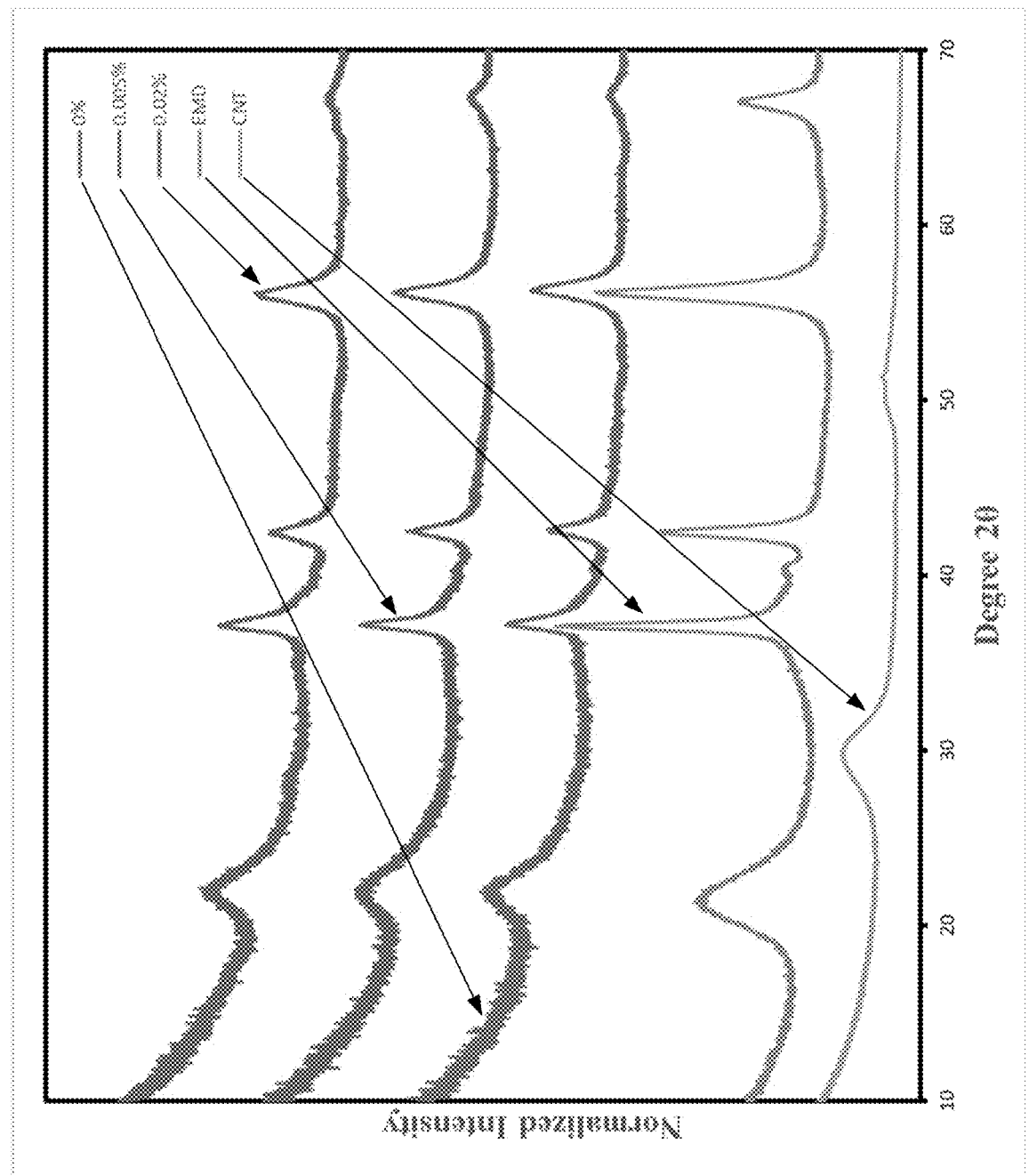
FIG. 2 shows the XRD pattern of the EMD samples a) commercial EMD b) EMD+0% CNT c) EMD+0.005% CNT d) EMD+0.02% CNT.

The typical XRD pattern for carbon nanotubes shows a single 002 peak at approximately 30° 2θ; however, due to the low concentration within each sample it is not sufficient to develop an adequate peak. This means the presence of carbon nanotubes cannot be determined using XRD analysis for these samples. FIG. 2 shows the XRD pattern of the EMD samples a) commercial EMD b) EMD+0% CNT c) EMD+0.005% CNT d) EMD+0.02% CNT.

Material Characterization

Due to cation vacancies, Mn(III) ions and structural water, EMD is not a stoichiometric material.

The compositional features of each of the samples were determined using a potentiometric titration technique outlined by Vogel. 0.100 g of the EMD sample was dissolved into 25 mL of 0.25 M acidified (10% $H_2SO_4$) ferrous ammonium sulfate (($NH_4$)$FeSO_4$; BDH Chemicals Australia; 99%) solution i.e.,

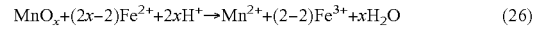

$$MnO_x+(2x-2)Fe^{2+}+2xH^+ \rightarrow Mn^{2+}+(2-2)Fe^{3+}+xH_2O \quad (26)$$

This solution was titrated against a standardized (oxalate method) 0.04 M potassium permanganate ($KMnO_4$; Ajax Finechem; 99%) solution, with the volume of permanganate denoted as $V_1$; i.e.,

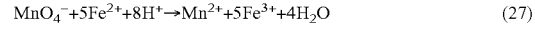

$$MnO_4^-+5Fe^{2+}+8H^+ \rightarrow Mn^{2+}+5Fe^{3+}+4H_2O \quad (27)$$

A blank titration with no EMD was performed and the volume required to reach the endpoint denoted $V_0$. After the first titration, approximately 20 g of tetra-sodium pyrophosphate ($Na_4P_2O_7$; Ajax Finechem; 99%) was added to the solution to stabilize the formation of the Mn(III) complex forming in the following titration. The pH of this solution was adjusted to the range of 6-7 by the addition of ~0.20 M sulfuric acid. A second titration was performed with the same standardized $KMnO_4$ solution, and the volume required to reach the endpoint denoted $V_2$, i.e., $$4Mn^{2+}+MnO_4^-+8H^++5Mn(H_2P_2O_7)_3^{3-}+4H_2O \quad (28)$$

The value of x in $MnO_x$ was calculated using

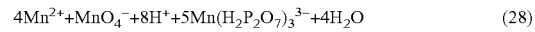

$$x = 1 + \frac{5(V_0 - V_1)}{2(V_2 - V_1)} \quad (29)$$

Subsequently the total manganese content of the sample (% Mn(T)) can be found using $$\% \, Mn(T) = \frac{m_{Mn}}{m_{Dry}} \times 100\% \quad (30)$$

Where $m_{Mn}$ is the mass of manganese in the dry EMD sample found from the second titration and $m_{Dry}$ is the dry mass of EMD in the sample determined after heating the original EMD sample in air at 100° C. for 2 hours. The relative proportions of Mn(III) and Mn(IV) species (% Mn(III) and % Mn(IV)), respectively were found using:

$$\% \, Mn(III) = (4-2x) \times \% \, Mn(T) \quad (31)$$

$$\% \, Mn(IV) = (2x-3) \times \% \, Mn(T) \quad (32)$$

The cation vacancy fraction (CVF) was found using $$CVF = \frac{m}{m+2} \quad (33)$$

Where $$m = (2-x) + \frac{M_{Mn} \times \% \, H_2O(+110)}{M_{H_2O} \times \% \, Mn(T)} \quad (34)$$

Where $M_{Mn}$ and $M_{H2O}$ are the molar masses of manganese and water, respectively, and % $H_2O(+110)$ is the percentage of structural water in the material determined by heating the dry EMD sample at 400° C. in air for 2 hours.

TABLE 2

Compositional properties of the MnO$_2$-CNT composite materials used in this work

| Sample | MnO$_x$ | Composition | | | | X | Y |
| | | % Mn(T) | % Mn(IV) | % Mn(III) | % H$_2$O | | |
|---|---|---|---|---|---|---|---|
| EMD | 1.968 | 59.08 | 55.41 | 3.67 | 3.20 | 0.089 | 0.056 |
| 0% | 1.986 | 58.09 | 56.46 | 1.64 | 3.73 | 0.094 | 0.025 |
| 0.005% | 1.917 | 60.98 | 50.90 | 10.07 | 3.17 | 0.107 | 0.147 |
| 0.02% | 1.968 | 60.42 | 56.56 | 3.86 | 3.98 | 0.104 | 0.057 |

Conductivity

The electronic conductivity of the MnO$_2$-CNT composites was determined by compacting the powdered material into a pellet using a hydraulic press at 0.35 MPa increments. The resistivity at each increment was recorded after it equilibrated due to movement of particles as the pressure changed, until the resistivity plateaued.

When considering the performance of MnO$_2$ as the active material in an energy storage device one of its limiting properties is poor electronic conductivity ($10^{-2}$-$10^{-4}$ S cm$^{-1}$). This issue is remedied through the addition of a highly conductive medium, generally graphite, which binds all the MnO$_2$ particles together allowing for sufficient electron transport throughout the entirety of the available active material. This becomes an issue when manufacturing an energy storage device. Anywhere up to 80% of the cathode is primarily conductive medium meaning that performance in the system is sacrificed due to a lack of active material. Through the synthesis method used in this work, the single walled carbon nanotubes (SWCNT) are thought to produce composite MnO$_2$-CNT electrodes with higher conductivity due to the CNTs forming a conductive network structure within the interior of each particle, as well as potentially inter-particle bridging which facilitates the transport of electrons within the MnO$_2$ particle and between multiple MnO$_2$ particles. From the SEM images the interparticle bridging may be evident and would result in an increase in conductivity throughout the material.

Figure 4:
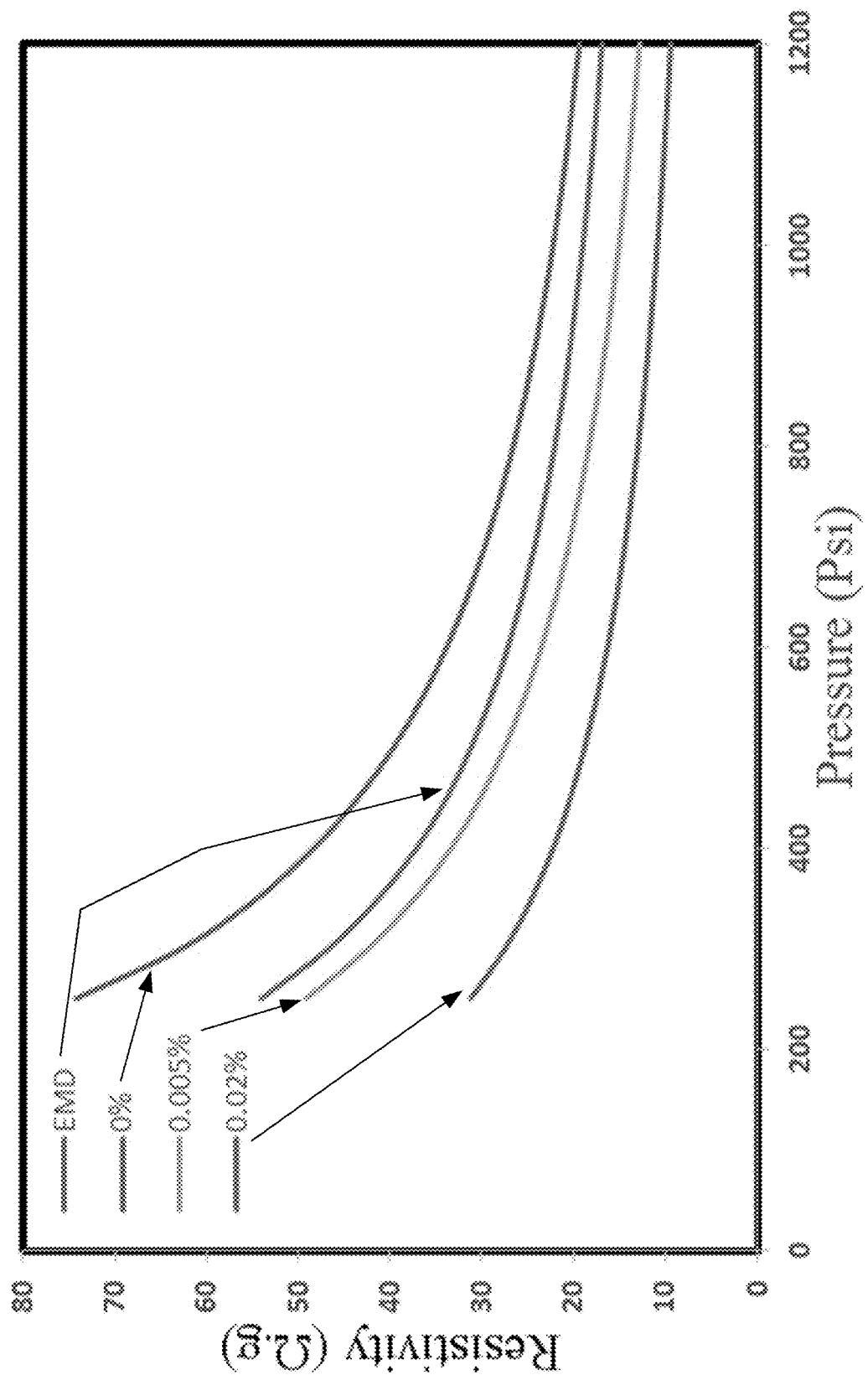
FIG. 4 shows a resistivity plot for each of the materials as a function of pressure.

FIG. 4 shows a resistivity plot for each of the materials as a function of pressure. This figure shows that the electroplated γ-MnO$_2$ exhibits the highest initial resistivity value, however, as the pressure increases it plateaus out to approximately that of a commercial EMD sample. These two samples exhibit a resistivity of 31.65 Ω·cm and 97.20 Ω·cm for the γ-MnO$_2$ and commercial EMD samples or a conductivity of 3.16×10$^{-2}$ S·cm$^{-1}$ and 1.03×10$^{-2}$ S·cm$^{-1}$, respectively. It can be observed that the addition of 0.005% CNT reduces the resistivity of the material at all points leading to a resistivity value of 18.02 Ω·cm and a conductivity of 5.55×10$^{-2}$ S·cm$^{-1}$ at infinite pressure. The addition of 0.02% CNT shows a significant decrease in the resistivity at the initial pressure and gives a resistance value 14.57 Ωcm and a conductivity of 6.86×10$^{-2}$ S·cm$^{-1}$. Both materials show an increase in conductivity compared to the EMD samples This equates to a 5-7 times increase in conductivity for the 0.005% CNT and 0.02% CNT composite MnO$_2$ material compared to the commercial EMD sample, and a doubling in the conductivity of the γ-MnO$_2$ material at infinite pressure. The increase in conductivity is due to the increase in favored channels for the electrons to pass through rather than the poorly conductive bulk manganese dioxide material. The increase in conductivity also gives a quantitative determination that carbon nanotubes are in fact contained within the manganese dioxide particle resulting in a positive increase in the conductivity and the inter-particle bridging seen in the SEM images may in fact be the result of the SWCNT.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A composite material comprising:
   electro-deposited manganese dioxide particles of up to 110 micron in size and in a form of γ-modification of manganese dioxide; and
   single-walled carbon nanotubes with a diameter of 1 to 2 nm and a length of 1 to 5 µm,
   wherein a content of the carbon nanotubes is 0.0001 to 0.1 wt % of the composite material.

2. The composite material of claim 1, wherein the particles have an average size of about 40-60 microns.

3. The composite material of claim 1, wherein the carbon nanotubes form a coating on a surface of the particles and extend inward from the surface.

4. The composite material of claim 1, wherein the single-wall carbon nanotubes form a three-dimensional conductive network in the material.

5. A composite material comprising:
   electro-deposited manganese dioxide particles of up to 110 micron in size and in a form of γ-modification of manganese dioxide;
   a coating of carbon nanotubes with a diameter of 1 to 2 nm and a length of 1 to 5 µm; and
   a three-dimensional structure of carbon nanotubes penetrating into the particles,
   wherein a content of the carbon nanotubes is 0.0001 to 0.1 wt % of the composite material.

6. The composite material of claim 5, wherein the particles have an average size of about 40-60 microns.

7. The composite material of claim 5, wherein the carbon nanotubes are single walled.

8. The composite material of claim 7, wherein the single-wall carbon nanotubes form a three-dimensional conductive network in the material.

* * * * *